Feb. 25, 1958 J. A. F. ROCHÉ ET AL 2,824,548
FLUID ACTUATOR
Filed Sept. 16, 1955 2 Sheets-Sheet 1
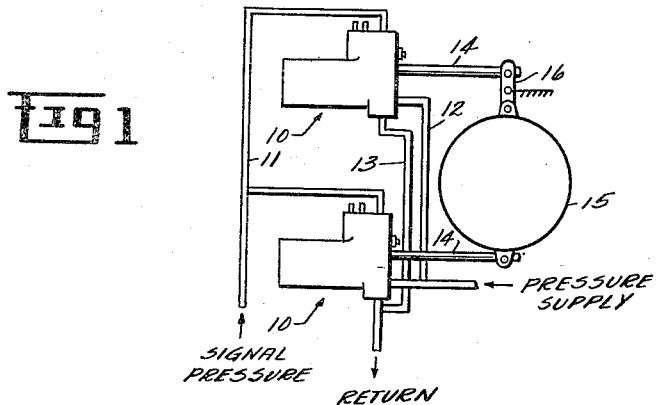
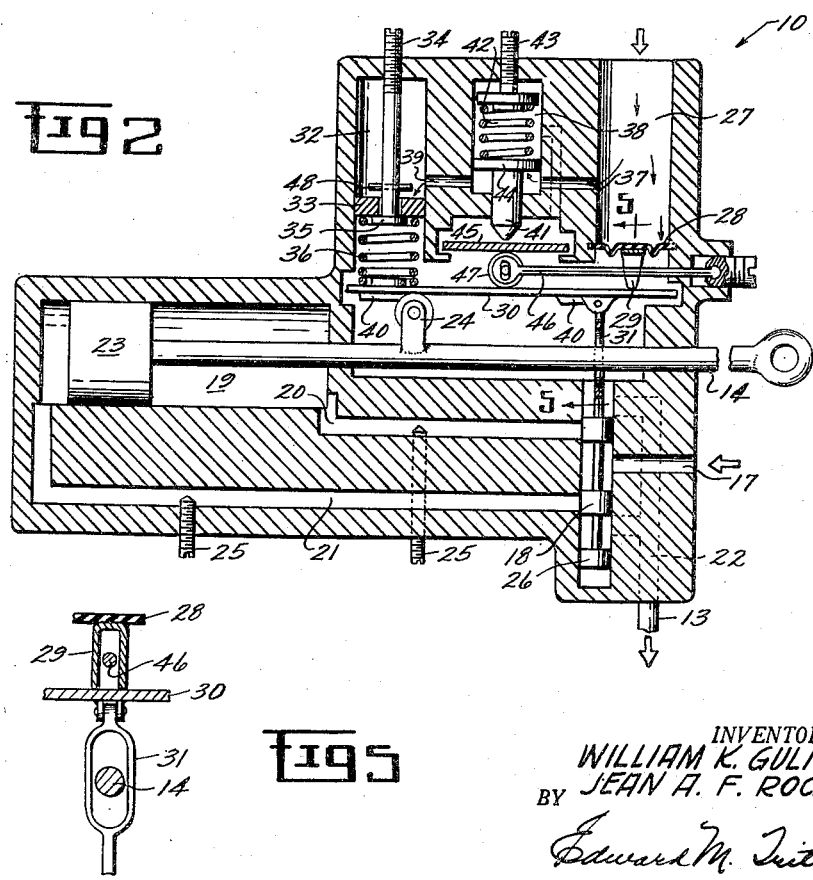
INVENTORS.
WILLIAM K. GULICK,
BY JEAN A. F. ROCHÉ
Edward M. Title
THEIR ATTORNEY.

Feb. 25, 1958     J. A. F. ROCHÉ ET AL     2,824,548
FLUID ACTUATOR
Filed Sept. 16, 1955     2 Sheets-Sheet 2
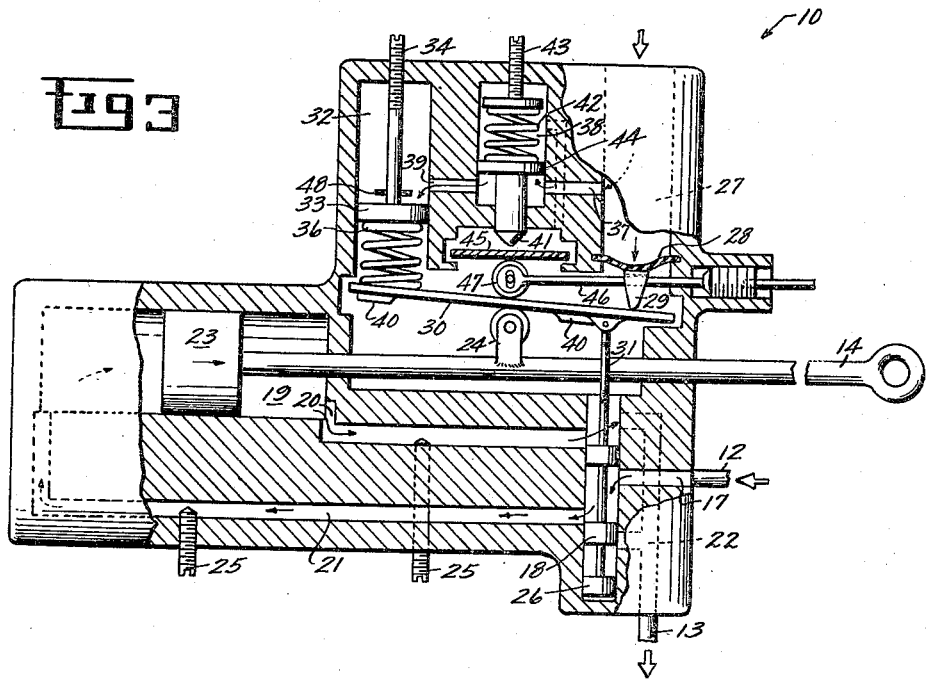
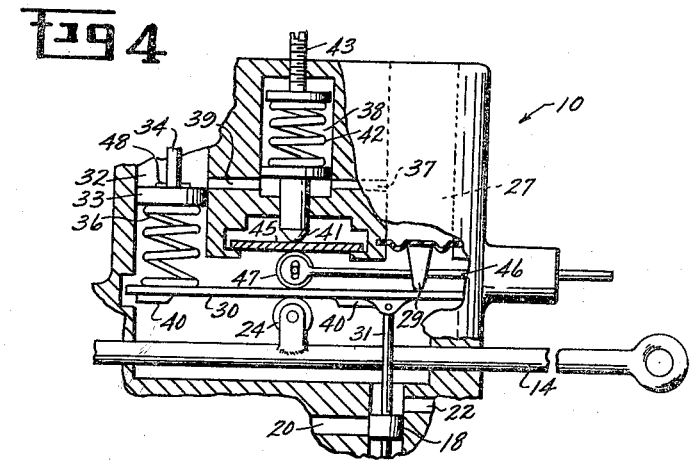
INVENTORS,
WILLIAM K. GULICK
BY JEAN A. F. ROCHÉ
THEIR ATTORNEY

United States Patent Office 2,824,548
Patented Feb. 25, 1958

2,824,548

FLUID ACTUATOR

Jean Alfred Felix Roché, Reading, and William Knowlton Gulick, Cincinnati, Ohio, assignors to General Electric Company, a corporation of New York Application September 16, 1955, Serial No. 534,821

8 Claims. (Cl. 121—41)

The present invention relates to a fluid actuator that is responsive to a fluid pressure signal and, more particularly, to a fluid actuator which lends itself to synchronization with other fluid actuators of the same type when connected in parallel therewith.

The actuator hereinafter described utilizes a controlled static fluid pressure to operate an internal linkage causing the power means of the actuator to move to a position corresponding to the static fluid pressure provided.

The principle advantage of the novel actuator lies in the usage of a fluid pressure signal which is not affected by differential expansion and compression due to temperature changes or temperature differences. It is furthermore unaffected by the changing strain existing in highly stressed machinery, such as modern jet engines.

The actuator, while designed primarily for use with other actuators of the same type for synchronization of the stator blades of a variable stator compressor, has utility in and of itself wherever an accurate resultant movement is desired in response to a fluid signal pressure. The use of a plurality of the invented actuators enables uniform loading and displacement of the variable stator vanes or exhaust nozzle mechanism on gas turbine engines. However, its use is not intended to be limited merely to the illustrative example.

Wherever one or more actuators are intended to be synchronized so that each operates exactly as the others in the system, it is desirable to avoid the use of springs. Generally speaking, it is difficult to get two devices to do the same thing with the same signal wherein springs are relied upon to be responsive to the signal. This problem may be overcome if each device has a spring which has the same rate as every other spring in the system. However, practically speaking, it is impossible to mass-produce springs and guarantee that the rate of each spring is the same. In order to get two springs with the same rate, many hundreds of springs are made and tested to provide the two identical springs desired. Consequently, this is a very impractical and wasteful means of obtaining identical characteristics. It is possible to use springs if a very limited range of the springs is employed. Within such range the accuracy of the spring rate is satisfactory.

The actuator of the present invention reduces the dependency upon identical springs and relies instead on a lever motion whose accuracy is more reliable than that of springs. Where a spring is used in the present invention, it is used only on a limited portion of its range wherein its accuracy is quite constant and reliable.

The main object of the present invention is to accurately establish an actuator output position unaffected by differential thermal expansion, mechanical strain, or other operating conditions and to permit duplicity in the operation of a multiplicity of actuators.

A further object of the invention is to permit a plurality of actuators to respond uniformly to a static fluid pressure signal, thus rendering unnecessary mechanical, hydraulic, electrical or other synchronization means.

Another object is to provide an improved fluid actuator which is capable of synchronous operation with other such actuators and which is economical to manufacture since it does not require the use of precision-matched biasing means.

Another object of the invention is to provide such a fluid actuator which has a fail-safe feature.

Briefly stated, in accordance with one aspect of our invention, we provide an actuator responsive to a fluid signal pressure, which pressure operates on a biased lever mechanism to actuate a pilot valve and means are provided for adjusting the biasing means which is arranged to operate over a very narrow range of its available range of deflections to provide accuracy. In addition, a fail-safe feature is incorporated within the fluid actuator that is operable upon failure or loss of the fluid signal pressure to actuate the piston to a predetermined desired position, or to permit manual control of the actuator.

The invention will be better understood from the following description taken in connection with the accompanying drawing and its scope will be pointed out in the appended claims.

Figure 1 is a schematic showing of two of the invented actuators connected for synchronized operation to a ring;

Figure 2 is a cross-sectional view through an actuator;

Figure 3 is a view similar to Figure 2 showing a different position of the actuator;

Figure 4 is a partial cross-sectional view of the actuator illustrating the operation of the fail-safe feature; and Figure 5 is a partial cross-sectional view taken on line 5—5 of Figure 2.

Referring first to Figure 1, there is shown a pair of actuators generally indicated 10, connected in parallel with each other by means of a signal pressure line 11, power pressure supply line 12, and return line 13. Each actuator 10 has a piston rod 14 movable in synchronism in response to changes in signal pressure as communicated by line 11. Rod 14 may be connected to any suitable mechanism wherein synchronous operation is desired. As shown, rods 14 are connected to a ring 15 which may be used to actuate the stator vanes in a variable stator compressor. Lever 16 merely reverses the direction of the force applied by one rod 14 so that both actuators 10 rotate ring 15. As will hereinafter be explained, rods 14 apply the same force at the same rate to ring 15 to provide movement of ring 15 without distortion.

Referring next to Figure 2, the structural features of one of the actuators will be described. Generally speaking, the actuator housing 10 is divided into two pressure systems, the upper or signal pressure system being generally above rod 14, and the working fluid or pressure supply system being below rod 14 as seen in Figure 2. The pressure supply system comprises an inlet port 17 to admit high pressure fluid to a pilot or fluid distributing valve 18 which, depending upon its position, directs the high pressure fluid to either of the two ends of a piston chamber 19 by means of suitable passages 20 and 21 to form a fluid motor means. A return passage 22 is provided to handle the exhaust fluid as will hereinafter be described. Thus far described, the high pressure system is a conventional means of moving a piston depending on the position of valve 18. A piston 23 is connected to rod 14 for actuation thereof in response to the pressure applied by the pressure supply system. Rod 14 is guided by any suitable means, such as a sliding fit in the walls of the actuator 10 as shown. Mounted on rod 14, remote from the high pressure system, is a fulcrum member 24 for a purpose to be described. Suitable rate valves 25 control the flow of fluid in passages 20 and 21 as will be described. A damping means 26 may be connected to distributing valve 18, as shown, for smooth operation thereof. Thus, it will be seen that, depending on the position of valve 18, the piston 23 moves to the right or left as actuated by the high pressure supply through inlet port 17, and the expelled fluid is returned to a sump (not shown) through passage 22.

The upper or signal pressure system comprises a signal pressure chamber 27, which may be an extension of line 11, having a pressure responsive diaphragm 28 at the lower end thereof sealing off said chamber. Diaphragm 28 has a force applying extension 29 thereon to react on floating lever 30 which is in turn pivotly connected to valve 18 by means of rod 31. Lever 30 rotates about fulcrum 24 to position valve 18 in response to a change in signal pressure in chamber 27.

A second chamber 32 contains a floating piston 33 and spring adjusting means 34 for limiting the downward movement of piston 33 in chamber 32 by means of head 35. A spring 36 is disposed between piston 33 and lever 30 for reaction against the piston 33 and lever 30. The system is designed so that spring 36 is always operating about the same point on its gradient versus deflection curve thus eliminating the need for an accurate spring and yet providing accurate positioning and permitting synchronization between two or more actuators. Communication of the signal pressure fluid between chambers 32 and 27 is established by means of passage 37, chamber 38 and passage 39.

In adjusting the system thus far described for operation, the fluid is admitted from the signal pressure system under normal pressure which, for example, may be twenty pounds. By means of adjusting means 34, spring 36 which is under compression is adjusted for a lesser value, for example, ten pounds. Normally, this is sufficient to compress spring 36 an extremely small amount, and the force on the spring during subsequent operation will vary around this point within a very narrow range thus assuring operation of the spring with great accuracy. The system then balances the moments about fulcrum 24.

In operation, as the signal pressure in chamber 27 is increased, diaphragm 28 deflects as shown in Figure 3 to rotate lever 30 in a clockwise direction about fulcrum 24 to be resisted by compression of spring 36 a very small amount. As lever 30 rotates clockwise, it operates valve 18 to permit high pressure fluid to enter the left end of chamber 19 thus moving piston 23 and fulcrum 24 to the right. Movement continues until fulcrum 24 balances the forces on lever 30 whereupon valve 18 stops the movement of piston 23. As shown in Figure 3, lever 30 is illustrated just before the balancing position is reached. It is to be noted that the showing in Figure 3 is greatly exaggerated in that the rotation of lever 30 is very small and in the order of only a few thousandths of an inch. In this respect, valve 18 is shown somewhat enlarged to illustrate the principle of operation. Rod 14, having moved to a new position in response to a change in the signal pressure, remains there by reason of the rebalancing of moments on lever 30 until a new signal pressure indicates further movement of the rod 14. The mechanism, as thus far described, therefore operates on a very limited range of spring 36 and relies on the lever 30 for multiplication of the signal pressure to actuate rod 14. Since the operation of spring 36 is very limited and over an accurate range of the spring, any number of actuators 10 may be connected to provide synchronous operation as shown in Figure 1. After adjustment of the spring 36 and rate valves 25, the operation of rods 14 at the same rate and over the same distance in synchronism with one another is assured.

If the piston 23 should move too fast, it is possible for over-travel to occur and result in contact between piston 23 and the ends of chamber 19. In order to avoid mechanical damage from overtravel, means is provided to reduce or reverse the fluid pressures on the piston 23 when actuator full travel is reached. This means comprises a pair of cams 40 on each end of lever 30. Cams 40 are so disposed that fulcrum 24 contacts them on either end before piston 23 strikes the end of chamber 19, thus providing a positive and rapid movement to valve 18 to admit high pressure fluid accordingly and provide an hydraulic stop for piston 23.

While the above described mechanism is sufficient to provide synchronous movement of two or more actuators connected in parallel as shown in Figure 1, the present invention provides an additional important feature. In certain types of service, if the device should fail, it is desirable that it should assume a "fail-safe" position. This may be described as a predetermined position for rod 14 which, in the absence of the means to further actuate the rod, is a predetermined desired static position. In other words, if the actuators are used to operate variable stator vanes in a compressor, upon failure of the signal pressure it is desirable that these vanes should be placed in a preselected fixed position which, for the illustration given, is a position that prevents the compressor from passing through a stall region. Consequently, rod 14 must assume some predetermined position which, for illustration, may be taken as approximately the mid-position of its travel through chamber 19.

The fail-safe mechanism comprises an intermediate chamber 38 between chambers 27 and 32 as shown in Figure 2. Chamber 38 is connected by the aforementioned passages 37 and 39 with chambers 27 and 32, respectively. A floating guided plunger 41 is urged downward by compressed spring 42 whose compression is adjusted by adjusting means 43. The normal line pressure in the signal pressure line 11 is sufficient to compress spring 42 and maintain plunger 41 in a floating position above passages 37 and 39 to permit free flow of fluid therethrough and, by reaction against head 44, to keep the spring 42 under compression. Plunger 41 is adapted to react against a floating plate 45 which may move a limited amount within the housing 10. An adjustable rod 46, by means of a slotted connection, carries a wheel 47 disposed between plate 45 and lever 30. As shown, the adjusting means for the rod permits longitudinal adjustment and fixing in one position. It will be appreciated that the longitudinal position of rod 46 may be varied by connection to an outside variable source as shown in Figure 3 whereby rod 46 may be subject to continuous adjustment from the outside source to vary the position of wheel 47 and the final fail-safe position.

If the signal pressure should fail, spring 42 forces plunger 41 against plate 45 and wheel 47 to rotate lever 30 in a clockwise direction about fulcrum 24 as shown in Figure 4. Rotation of lever 30 actuates valve 18 to admit high pressure supply fluid to actuate piston 23 and cause its movement to the right. Under these circumstances, no force is exerted by extension 29, nor by spring 36. Movement of piston 23 to the right continues until fulcrum 24 is aligned with wheel 47 whereby the forces on lever 30 are balanced. Thus, the position of wheel 47 determines the final position of piston 23 in the fail-safe position. If piston 23 is in its extreme right position when the signal pressure fails, lever 30 will rotate counter-clockwise admitting high pressure fluid to the right of piston 23 and forces the piston and rod 14 to the left until fulcrum 24 and wheel 47 are aligned again to balance the forces. Thus, regardless of the position of piston 23, upon failure of the signal pressure, rod 14 assumes a predetermined desired position, as determined by the setting of wheel 47, and is maintained there until the signal pressure is reactivated and calls for a different position. Upon reactivation of the signal pressure, piston 23 will assume normal operation. A stop 48 may be supplied on adjusting means 34 to maintain piston 33 below passage 39 and permit reactivation of the system upon the return of signal pressure. Similarly, head 44 of plunger 41 may be designed not to cover passages 37 and 39 so that pressure may be re-established against head 44 to reactivate the system.

Thus, the actuator described permits paralleling as many actuators as desired and the various features hereinbefore described insure that the actuators will operate in synchronism with one another and will assume a preselected fail-safe position upon the failure of the signal pressure. It can be seen that lever 30 is relied upon primarily for the synchronization feature and the necessity for precise matching of springs, such as 36, is dispensed with.

While a particular embodiment of the invention has been illustrated and described, it will be apparent to those skilled in the art that various changes and modifications may be made without departing from the invention, and it is intended to cover in the appended claims all such changes and modifications that come within the true spirit and scope of the invention.

What we claim as new and desire to secure by Letters Patent is:

1. A fluid actuated device comprising a housing, a first fluid pressure supplied system in said housing, a piston and load-connected rod movable in response to said fluid pressure, a fulcrum on said rod, a pilot valve positionable to direct said fluid pressure against said piston, a second signal pressure supplied sysem independent of said first system, a lever connected to said valve and rotatable about said fulcrum, first means biasing said lever on one side of said fulcrum, second means responsive to change in said second signal pressure supplied system to bias said lever on the opposite side of said fulcrum, whereby movement of said piston is obtained until a moment balance occurs between said two biasing means on said lever, wherein said first biasing means comprises a spring, and a piston compressing said spring in response to said signal pressure, said spring being operative over a narrow portion of its deflection range.

2. A fluid actuated device comprising a housing, a first fluid pressure supplied system within said housing, a piston and load-connected rod actuated by said pressure system, a pilot valve positionable for directing fluid to one or the other side of said piston, a second signal pressure supplied system in said housing and independent of said first pressure system, a fulcrum on said rod movable therewith upon movement of said piston, a lever connected to said pilot valve to move said valve and operative about said fulcrum, means biasing said lever to actuate said valve, force-applying means responsive to the signal pressure and acting on said lever on the opposite side of said fulcrum from said biasing means whereby a change in signal pressure actuates said force-applying means to rotate said lever about said fulcrum and actuate said valve thus moving said piston, rod and fulcrum until a moment balance is obtained between said biasing means and said force-applying means, wherein said biasing means comprises a spring, and a piston compressing said spring in response to said signal pressure, said spring being operative over a narrow portion of its deflection range.

3. A fluid actuated device comprising a housing, a first fluid pressure supplied system in said housing, a piston and load-connected rod movable in response to said fluid pressure, a fulcrum on said rod, a fluid distributing valve movable to direct fluid against said piston, a second signal pressure supplied system in said housing independent of said first system, a lever between said systems rotatable intermediate its ends about said fulcrum and connected to said distributing valve to direct movement thereof, spring biasing means acting on one end of said lever and operative over a narrow portion of its available deflection range, a diaphragm responsive to changes in the signal pressure system and operative to apply force to the opposite end of said lever, whereby a change in signal pressure operates said lever to move said distributing valve, piston and fulcrum until a moment balance is obtained between said spring biasing means and said force-applying diaphragm means to place said load-connecting rod in a position corresponding to the changed signal pressure, wherein said spring biasing means includes a piston responsive to said signal pressure and acting on said spring to compress said spring within said narrow portion.

4. A fluid actuated device comprising a housing, a first fluid pressure supplied system in said housing, a piston and load-connected rod movable in response to said fluid pressure, a fulcrum on said rod, a pilot valve positionable to direct said fluid pressure against said piston, a second signal pressure supplied system independent of said first system, a lever connected to said valve and rotatable about said fulcrum, first means biasing said lever on one side of said fulcrum, second means responsive to change in said second signal pressure supplied system to bias said lever on the opposite side of said fulcrum, whereby movement of said piston is obtained until a moment balance occurs between said two biasing means on said lever, and said device having a fail-safe mechanism comprising an adjustable force-applying means acting on said lever, and spring means in said signal pressure system reactive against said adjustable force-applying means and held inactive by said signal pressure, whereby upon failure of said signal pressure, said spring means reacts on said adjustable force-applying means to rotate said lever about said fulcrum and move the piston, rod and fulcrum to align said fulcrum and adjustable force-applying means in a moment balancing fail-safe position.

5. A fluid actuated device comprising a housing, a first fluid pressure supplied system in said housing, a piston and load-connected rod movable in response to said fluid pressure, a fulcrum on said rod, a fluid distributing valve movable to direct fluid against said piston, a second signal pressure supplied system in said housing independent of said first system, a lever between said systems rotatable intermediate its ends about said fulcrum and connected to said distributing valve to direct movement thereof, spring biasing means acting on one end of said lever and operative over a narrow portion of its available deflection range, a diaphragm responsive to changes in the signal pressure system and operative to apply force to the opposite end of said lever, whereby a change in signal pressure operates said lever to move said distributing valve, piston and fulcrum until a moment balance is obtained between said spring biasing means and said force-applying diaphragm means to place said load-connecting rod in a position corresponding to the changed signal pressure, and said device having a fail-safe mechanism comprising an adjustable force-applying means acting on said lever, and a spring-biased plunger in said signal pressure system reactive against said adjustable force-applying means and held inactive by said signal pressure whereby, upon failure of said signal pressure, said plunger reacts on said adjustable force-applying means to rotate said lever about said fulcrum and move the piston, rod and fulcrum to align said fulcrum and adjustable force-applying means in a moment balancing fail-safe position.

6. A fluid actuated device comprising a housing, a first fluid pressure supplied system in said housing, a second signal pressure supplied system independent of said first system, a distributing valve within said first system, a piston and load-connected rod within said first system and movable as directed by said distributing valve, a fulcrum on said rod and movable therewith, a lever between said systems connected intermediate its ends to said distributing valve to direct movement thereof and rotatable about said fulcrum, a substantially constant biasing spring means acting on one end of said lever and operative over a narrow portion of its available deflection range, a force-applying diaphragm means in said signal pressure system and responsive to changes therein and acting on the opposite end of said lever to apply force thereto, whereby a change in said signal pressure actuates said lever and moves said distributing valve to direct fluid in the first pressure system on one side of said piston to move said piston, rod and fulcrum until a moment balance is obtained between said spring biasing means and said force-applying diaphragm means to place said load-connected rod in a position corresponding to the changed signal pressure, and said device having a fail-safe mechanism comprising an adjustable force-applying member acting on said lever, and a spring-biased plunger in said signal pressure sysem reactive against said adjustable force-applying member and held inactive by said signal pressure whereby, upon failure of said signal pressure, said constant biasing spring means and said force-applying diaphragm means are inactivated, and said plunger reacts on said adjustable force-applying member to rotate said lever about said fulcrum and move the piston, rod and fulcrum to align said fulcrum and adjustable force-applying means in a moment balancing fail-safe position.

7. A control means for positioning a fluid distributing valve responsive to a signal fluid pressure and actuable by the substantially constant force of a compression spring operating over a constant small portion of its available deflection range comprising means biasing a lever at both ends against a movable fulcrum positionable between the said biasing means, the lever biasing means at one end consisting of a force proportional to the said signal fluid pressure, the lever biasing means at the other end consisting of a force proportional to the said signal fluid pressure and opposed by said compression spring interposed between said lever and said signal fluid pressure, said compression spring exerting a constant positive force to cause rotation of said lever about said fulcrum upon a change in the signal fluid pressure level, and a linkage between said lever and said valve for positioning the said valve responsive to the position of the movable fulcrum and the amount of unbalance between the said biasing means, said fulcrum moving in response to fluid directed by said valve until the lever is in balance about the fulcrum whereupon said valve is in closed position.

8. A device described in claim 7 containing means for adjusting the force on said compression spring for synchronization of said fluid distributing valve positioning means with other like devices so that all of said compression springs operate over like small portions of their individual available deflection ranges regardless of deflection curve variances between the springs.

References Cited in the file of this patent
UNITED STATES PATENTS
2,273,972  McCune _____ Feb. 24, 1942